United States Patent
Matsuzaki et al.

(10) Patent No.: US 8,157,324 B2
(45) Date of Patent: Apr. 17, 2012

(54) COVER MATERIAL TERMINAL TREATING MEMBER, SEAT PART, AND VEHICLE SEAT

(75) Inventors: Tsutomu Matsuzaki, Tochigi (JP); Tsubasa Hitomi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 326 days.

(21) Appl. No.: 12/526,301

(22) PCT Filed: Feb. 7, 2008

(86) PCT No.: PCT/JP2008/052064

§ 371 (c)(1),
(2), (4) Date: Aug. 7, 2009

(87) PCT Pub. No.: WO2008/099757

PCT Pub. Date: Aug. 21, 2008

(65) Prior Publication Data

US 2010/0259079 A1 Oct. 14, 2010

(30) Foreign Application Priority Data

Feb. 7, 2007 (JP) ................................ 2007-028490

(51) Int. Cl.
*A47C 31/02* (2006.01)
(52) U.S. Cl. .............. 297/218.1; 297/218.4; 297/228.13
(58) Field of Classification Search .............. 297/218.1, 297/218.4, 218.5, 228.13
See application file for complete search history.

(56) References Cited

U.S. PATENT DOCUMENTS

| 3,801,154 | A | * | 4/1974 | Hultquist et al. | 297/218.1 |
| 3,928,898 | A | * | 12/1975 | Smoot | 297/218.1 |
| 5,478,134 | A | * | 12/1995 | Bernard et al. | 297/218.1 |
| 5,503,454 | A | * | 4/1996 | Sakamoto | 297/218.1 |
| 5,653,503 | A | * | 8/1997 | Taggart | 297/218.5 |
| 5,820,213 | A | * | 10/1998 | Severinski | 297/218.5 |
| 6,364,347 | B1 | * | 4/2002 | Holdampf et al. | 280/730.2 |
| 6,568,761 | B2 | * | 5/2003 | Perske et al. | 297/452.6 |
| 7,073,693 | B2 | * | 7/2006 | Law | 223/50 |
| 7,585,025 | B2 | * | 9/2009 | Welch et al. | 297/218.2 |

FOREIGN PATENT DOCUMENTS

| JP | H06277373 | 10/1994 |
| JP | H0753554 | 12/1995 |
| JP | 2004242934 | 9/2004 |
| JP | 2005118439 | 5/2005 |
| JP | 2006298176 | 11/2006 |

* cited by examiner

*Primary Examiner* — Peter R. Brown
(74) *Attorney, Agent, or Firm* — Schiff Hardin LLP

(57) ABSTRACT

There is provided a long-life and strong cover material terminal treating member in which the terminal treatment of a cover material is easy to perform, and the terminal of the cover material is less liable to be taken away by a force from the outside, and which can withstand a long-time use. The cover material terminal treating member 10 for a seat part in which a cushion material 23 is covered with a cover material 24 includes a retaining plate 17 fixed to the terminal of the cover material 24a and a retaining clip 11 for storing the retaining plate 17. The retaining clip 11 includes a first wall part 12 fixed at a position different from the terminal of the cover material 24a, a second wall part 14 facing to the first wall part 12, and a connecting part 13 for connecting the two wall parts 12 and 14 to each other. In the end part of the second wall part 14, a retaining claw 16 bent at an acute angle and being in contact with one end side of the retaining plate 17 is erectingly provided. In the first wall part 12, a protrusion 15 in contact with the other end side of the retaining plate 17 is erectingly provided. The protrusion 15 is provided on the opening 19 side of a position at which the retaining plate 17 is in contact with the first wall part 12.

14 Claims, 7 Drawing Sheets

Prior Art

COVER MATERIAL TERMINAL TREATING MEMBER, SEAT PART, AND VEHICLE SEAT

TECHNICAL FIELD

The present invention relates to a cover material terminal treating member, a seat part, and a vehicle seat. More particularly, it relates to a cover material terminal treating member for joining the terminals of a cover material covering a cushion material, a seat part provided with this cover material terminal treating member, and a vehicle seat.

BACKGROUND ART

Generally, the surface of a seat part such as a seat cushion (seating part), a seat back, an armrest, and a headrest of a vehicle seat is configured by joining a plurality of cover materials. These cover materials are fixed by being subjected to terminal treatment after being put on a cushion material and the like. As a technique for terminal treatment of a cover material, for example, in the case of a headrest, there has been proposed a trim terminal fixing structure in which the terminals on the front surface side and the back surface side of a trim cover are connected to each other by a retaining clip (for example, refer to Patent Document 1, cited below).

In the structure described in Patent Document 1, the retaining clip, which is formed substantially into an h shape, includes a trim fixing part extending forward, a retaining part bent to inverse L shape downward from the rear end portion of the trim fixing part, and a board fixing part extending straight rearward from the rear end portion of the trim fixing part. One end part of a trim cover is sewingly fixed to the trim fixing part of the retaining clip, and a retaining plate consisting of a plate body is sewingly fixed to the other end part of the trim cover. The retaining clip is fitted to a board embedded in a pad in a headrest, and is fixed to the board with staples in the board fixing part of the retaining clip. The retaining plate is retained by being inserted in the retaining part of the retaining clip, by which both end parts of the trim cover are fixed.

Since the trim terminal fixing structure is configured as described above, the treatment of both terminals of the trim cover can be performed easily. Also, since the retaining clip is fixed to the board, even if the trim cover is shrunken, for example, by a difference in temperature, the retaining clip is not pulled and moved, so that the leverage of the retaining plate is less, and the retaining part is less liable to open. Therefore, the trim cover is less liable to come off the retaining plate.

Also, for example, in the case of a seat back, there has been proposed a terminal fixing structure in which a front surface side terminal 101a and a back surface side terminal 101b of a bag-shaped trim cover 101 covering a pad material are connected to each other in a lower portion on the back surface side of the seat back (for example, refer to Patent Document 2, cited below). In the structure described in Patent Document 2, and as shown in FIG. 7 herein, in a tip end part provided so as to extend to the back surface side from a lower frame 106 of a seat back frame arranged in the right-and-left direction in a lower part of the seat back, an engagement wire 108 having an engagement part 107 substantially parallel with the lower frame 106 is provided. To the front surface side terminal 101a of the trim cover 101, a substantially downward U-shaped resin hook 102 having an engagement groove 103, which hook is hookedly locked to the engagement part 107, is attached. Also, to the back surface side terminal 101b of the trim cover 101, a plate-shaped retaining member 105 is sewingly attached. The plate-shaped retaining member 105 is hookedly put into the engagement groove 103 of the resin hook 102 by being rotated from the upside.

Of two wall parts forming the engagement groove 103 of the resin hook 102, one wall part is formed so as to be shorter, and a retaining claw 104 is formed at the tip end of the short wall part. The retaining claw 104 retains the lower end of the plate-shaped retaining member 105 when the plate-shaped retaining member 105 is hookedly put into the engagement groove 103. Also, the tip end of the plate-shaped retaining member 105 is bent substantially to L shape. Since this terminal treating structure is configured as described above, the front surface side terminal and the back surface side terminal of the bag-shaped trim cover can be joined to each other very easily, and also the appearance of the terminal treating part can be improved. Further, for the structure described in Patent Document 2, a special-purpose tool required for attachment and detachment of the trim cover in the case where the terminal treatment is performed by using a hook ring is unnecessary, and the attachment and detachment thereof are easy.

Patent Document 1: Japanese Examined Utility Model Application Publication No. 7-53554 (columns 3-4, FIGS. 1 and 3).

Patent Document 2: Japanese Unexamined Patent Application Publication No. 6-277373 (pages 5-6, FIGS. 1 and 8).

Problems to be Solved

Unfortunately, for the trim terminal fixing structure described in Patent Document 1, the retaining plate is merely inserted in the retaining part, and therefore there is a play between the retaining plate and the inner wall of the retaining part. Therefore, this structure has a problem in that if a force in the direction such that the retaining plate is pulled out of the retaining part is applied to the trim cover from the outside for any reason, the retaining plate tends to slip out of the retaining part, adopting a slantwise posture in the retaining part and widening the retaining part, and resultantly the retaining plate becomes liable to come off the retaining part.

To solve the problem with Patent Document 1, in the terminal treating structure described in Patent Document 2, the retaining claw 104 is provided, and also the plate-shaped retaining member 105 is bent substantially to an L shape and is disposed slantwise to lessen a play between the plate-shaped retaining member 105 and the inner wall of the engagement groove 103. However, the resin hook 102 described in Patent Document 2 still has a problem in that the plate-shaped retaining member 105 is liable to come off the retaining claw 104, so that the front surface side terminal 101a and the back surface side terminal 101b of the trim cover 101 are disconnected from each other.

The present invention has been made in view of the above circumstances, and accordingly an object thereof is to provide a long-life and strong cover material terminal treating member in which the terminal treatment of a cover material is easy to perform, and the terminal of the cover material is less liable to be taken away by a force from the outside, and which can withstand a long-time use.

Solutions to the Problems

To solve the above problems, in a cover material terminal treating member for a seat part in which a cushion material is covered with a cover material, the cover material terminal treating member includes a retaining plate fixed to the terminal of the cover material; and a retaining clip for storing the retaining plate in a clearance therein, the retaining clip including a first wall part fixed at a predetermined position different from the terminal; a second wall part arranged so as to face to the first wall part; and a connecting part for connecting the first wall part and the second wall part to each other so that an opening is provided on at least one end side of the clearance held between the second wall part and the first wall part, and is characterized in that in the end part on the opening side of the second wall part, a retaining claw bent at an acute angle to the first wall part side and being in contact with one end side of the retaining plate is erectingly provided, and on the surface on the second wall part side of the first wall part, a protrusion in contact with the other end side of the retaining plate is erectingly provided, the protrusion being provided on the opening side of a position at which the other end side of the retaining plate is in contact with the first wall part.

As described above, the retaining claw that is in contact with one end side of the retaining plate has an acute angle, and the protrusion that is in contact with the other end side of the retaining plate is provided on the opening side of a position at which the other end side of the retaining plate is in contact with the first wall part. Therefore, the retaining plate can be fixed slantwise in the state in which there is no play in the clearance in the retaining clip, so that the retaining plate can be prevented from easily coming off the retaining clip due to the play in the retaining clip. Also, since the retaining claw has an acute angle, the retaining plate is stably retained to the retaining claw, and is less liable to come off the retaining claw. Since the protrusion that is in contact with the other end side of the retaining plate is provided on the opening side of a position at which the other end side of the retaining plate is in contact with the first wall part, the retaining plate can be prevented from being moved or rotated by a force from the outside, and also one end side of the retaining plate can always be directed to the retaining claw, so that the retaining plate can be made less liable to come off the retaining claw. As a result, a cover material terminal treating structure in which the terminal of cover material is less liable to come off can be provided.

Furthermore, the configuration is such that the retaining plate fixed to the terminal of cover material and the retaining clip fixed at the predetermined position different from the terminal to store the retaining plate in the clearance therein are provided. Therefore, merely by retaining the retaining plate at the retaining clip, the terminals of cover material can be joined to each other, so that a cover material terminal treating member in which the joining and removing are easy to perform can be provided.

Also, the first wall part may be formed so that a portion on the connecting part side from the protrusion is thicker than a portion on the opening side. By this configuration, even if the retaining plate is moved by a force from the outside and a force is applied in the direction such that the clearance of the retaining clip is widened, the clearance of the retaining clip can be prevented from widening. As a result, the retaining plate can be prevented from coming off the retaining claw and going out of the retaining clip due to the widening of the clearance of the retaining clip. Also, since the clearance of the retaining clip is less liable to widen, portions in which the connecting part is connected to the first and second wall parts can be prevented from whitening and becoming weak. Therefore, a long-life cover material terminal treating member that can withstand a long-time use can be provided.

Furthermore, a portion ranging from the protrusion to a portion on the connecting part side of the second wall part through a portion on the connecting part side of the first wall part and the connecting part may be formed so as to thicker than portions on the opening side of the first and the second wall parts. By this configuration, even if the retaining plate is moved by a force from the outside and a force is applied in the direction such that the clearance of the retaining clip is widened, the clearance of the retaining clip can be prevented from widening. As a result, the retaining plate can be prevented from coming off the retaining claw and going out of the retaining clip due to the widening of the clearance of the retaining clip. Also, since the clearance of the retaining clip is less liable to widen, portions in which the connecting part is connected to the first and second wall parts can be prevented from whitening and becoming weak. Therefore, a long-life cover material terminal treating member that can withstand a long-time use can be provided.

Also, the height of the retaining claw is preferably larger than the thickness of one end side of the retaining plate. By forming the cover material terminal treating member in this manner, one end side of the retaining plate can be supported stably by the retaining claw. Also, the protrusion may have a support surface for supporting the other end side of the retaining plate, and the support surface may be arranged on the connecting part side from the retaining claw. Since the support surface is arranged on the connecting part side from the retaining claw as described above, the retaining plate can be supported stably by the support surface of protrusion and the retaining claw. Also, the retaining plate can be prevented from being moved or rotated by a force from the outside, and also one end side of the retaining plate can always be directed to the retaining claw, so that the retaining plate can be made less liable to come off the retaining claw.

A shock absorbing material may be provided on the support surface. By this configuration, since the shock absorbing material absorbs the movement of the retaining plate, the retaining plate can be further made less liable to move in the retaining clip, and the retaining plate can be supported further stably in the retaining clip.

The protrusion may have a substantially triangular shape in cross section, and the inclination of a slant surface on the connecting part side may be steeper than the inclination of the slant surface on the opening side. By this configuration, the retaining plate can be supported stably by the slant surface on the connecting part side having a relatively steep inclination. Also, since the slant surface on the opening side has a relatively gentle inclination, the protrusion can be prevented from becoming thin, and the strength of the protrusion can be maintained. The slant surface on the opening side may be configured so as to consist of a curved surface having an arcuate shape in cross section. By this configuration, the slant surface on the opening side is caused to serve as a guide when the retaining plate is inserted into the clearance in the retaining clip, so that the workability of insertion of the retaining plate can be improved.

The configuration may be such that the predetermined position is a terminal of the cover material different from the aforementioned terminal or a support plate of the seat part. By this configuration, one terminal of the bag-shaped cover material can be joined to the other terminal thereof by using the cover material terminal treating member in accordance with the present invention, and the terminal of cover material can be fixed to the support plate of the seat part.

To solve the above problems, in a seat part in which a cushion material is covered with a cover material using a cover material terminal treating member, the seat part is characterized in that the cover material terminal treating member includes a retaining plate fixed to the terminal of the cover material; and a retaining clip for storing the retaining plate in a clearance therein, the retaining clip including a first wall part fixed at a predetermined position different from the terminal; a second wall part arranged so as to face to the first wall part; and a connecting part for connecting the first wall part and the second wall part to each other so that an opening is provided on at least one end side of the clearance held between the second wall part and the first wall part, and is characterized in that in the end part on the opening side of the second wall part, a retaining claw bent at an acute angle to the first wall part side and being in contact with one end side of the retaining plate is erectingly provided, and on the surface on the second wall part side of the first wall part, a protrusion in contact with the other end side of the retaining plate is erectingly provided, the protrusion being provided on the opening side of a position at which the other end side of the retaining plate is in contact with the first wall part. By this configuration, even if a force is applied from the outside, the retaining plate is made less liable to come off the retaining clip, and the terminal of cover material is made less liable to come off. Also, a seat part provided with a long-life cover material terminal structure can be obtained.

To solve the above problems, in a seat part in which a support plate and a cushion material supported on the support plate are covered with a cover material, the seat part is characterized in that at the outer periphery of the support plate, a cover material terminal treating part including a retaining plate fixed to the terminal of the cover material, and a groove-shaped retaining clip part formed integrally at the outer periphery of the support plate to store the retaining plate in a clearance therein is provided, the retaining clip part including a first wall part; a second wall part formed on the support plate outer periphery side from the first wall so as to face to the first wall part; and a connecting part for connecting the first wall part and the second wall part to each other so that an opening is provided on one end side of the clearance held between the second wall part and the first wall part, and the cover material terminal treating part is characterized in that in the end part on the opening side of the second wall part, a retaining claw bent at an acute angle to the first wall part side and being in contact with one end side of the retaining plate is erectingly provided, and on the surface on the second wall part side of the first wall part, a protrusion in contact with the other end side of the retaining plate is erectingly provided, the protrusion being provided on the opening side of a position at which the other end side of the retaining plate is in contact with the first wall part.

As described above, the retaining claw that is in contact with one end side of the retaining plate has an acute angle, and the protrusion that is in contact with the other end side of the retaining plate is provided on the opening side of a position at which the other end side of the retaining plate is in contact with the first wall part. Therefore, the retaining plate can be fixed slantwise in the state in which there is no play in the clearance in the retaining clip part, so that the retaining plate can be prevented from easily coming off the retaining clip part due to the play in the retaining clip. Also, since the retaining claw has an acute angle, the retaining plate is stably retained to the retaining claw, and is less liable to come off the retaining claw. Since the protrusion that is in contact with the other end side of the retaining plate is provided on the opening side of a position at which the other end side of the retaining plate is in contact with the first wall part, the retaining plate can be prevented from being moved or rotated by a force from the outside, and also one end side of the retaining plate can always be directed to the retaining claw, so that the retaining plate can be made less liable to come off the retaining claw. As a result, a seat part provided with a cover material terminal treating structure in which the terminal of cover material is less liable to come off can be provided.

Furthermore, the configuration is such that the retaining plate fixed to the terminal of cover material and the retaining clip part fixed at the predetermined position different from the terminal to store the retaining plate in the clearance therein are provided. Therefore, merely by retaining the retaining plate at the retaining clip part, the terminals of cover material can be joined to each other, so that a seat part provided with a cover material terminal treating structure in which the joining and removing are easy to perform can be provided.

To solve the above problems, in a vehicle seat provided with a seat part in which a cushion material is covered with a cover material using a cover material terminal treating member, the vehicle seat is characterized in that the cover material terminal treating member includes a retaining plate fixed to the terminal of the cover material; and a retaining clip for storing the retaining plate in a clearance therein, the retaining clip including a first wall part fixed at a predetermined position different from the terminal; a second wall part arranged so as to face to the first wall part; and a connecting part for connecting the first wall part and the second wall part to each other so that an opening is provided on at least one end side of the clearance held between the second wall part and the first wall part, and is characterized in that in the end part on the opening side of the second wall part, a retaining claw bent at an acute angle to the first wall part side and being in contact with one end side of the retaining plate is erectingly provided, and on the surface on the second wall part side of the first wall part, a protrusion in contact with the other end side of the retaining plate is erectingly provided, the protrusion being provided on the opening side of a position at which the other end side of the retaining plate is in contact with the first wall part.

Also, to solve the above problems, in a vehicle seat provided with a seat part in which a support plate and a cushion material supported on the support plate are covered with a cover material, the vehicle seat is characterized in that at the outer periphery of the support plate, a cover material terminal treating part including a retaining plate fixed to the terminal of the cover material, and a groove-shaped retaining clip part formed integrally at the outer periphery of the support plate to store the retaining plate in a clearance therein is provided, the retaining clip part including a first wall part; a second wall part formed on the support plate outer periphery side from the first wall so as to face to the first wall part; and a connecting part for connecting the first wall part and the second wall part to each other so that an opening is provided on one end side of the clearance held between the second wall part and the first wall part, and the cover material terminal treating part is characterized in that in the end part on the opening side of the second wall part, a retaining claw bent at an acute angle to the first wall part side and being in contact with one end side of the retaining plate is erectingly provided, and on the surface on the second wall part side of the first wall part, a protrusion in contact with the other end side of the retaining plate is erectingly provided, the protrusion being provided on the opening side of a position at which the other end side of the retaining plate is in contact with the first wall part. By this configuration, even if a force is applied from the outside, the terminal of cover material is made less liable to come off, and also a vehicle seat provided with a long-life cover material terminal structure can be obtained.

Advantages of the Solutions

The retaining claw that is in contact with one end side of the retaining plate has an acute angle, and the protrusion that is in contact with the other end side of the retaining plate is provided on the opening side of a position at which the other end side of the retaining plate is in contact with the first wall part. Therefore, the retaining plate can be fixed slantwise in the state in which there is no play in the clearance in the retaining clip, so that the retaining plate can be prevented from easily coming off the retaining clip due to the play in the retaining clip. Also, since the retaining claw has an acute angle, the retaining plate is stably retained to the retaining claw, and is less liable to come off the retaining claw. Since the protrusion that is in contact with the other end side of the retaining plate is provided on the opening side of a position at which the other end side of the retaining plate is in contact with the first wall part, the retaining plate can be prevented from being moved or rotated by a force from the outside, and also one end side of the retaining plate can always be directed to the retaining claw, so that the retaining plate can be made less liable to come off the retaining claw. As a result, a cover material terminal treating structure in which the terminal of cover material is less liable to come off can be provided.

Furthermore, the configuration is such that the retaining plate fixed to the terminal of cover material and the retaining clip fixed at the predetermined position different from the terminal to store the retaining plate in the clearance therein are provided. Therefore, merely by retaining the retaining plate at the retaining clip, the terminals of cover material can be joined to each other, so that a cover material terminal treating member in which the joining and removing are easy to perform can be provided.

Also, the first wall part may be formed so that the portion on the connecting part side from the protrusion is thicker than the portion on the opening side. By this configuration, even if the retaining plate is moved by a force from the outside and a force is applied in the direction such that the clearance of the retaining clip is widened, the clearance of the retaining clip can be prevented from widening. As a result, the retaining plate can be prevented from coming off the retaining claw and going out of the retaining clip due to the widening of the clearance of the retaining clip. Also, since the clearance of the retaining clip is less liable to widen, portions in which the connecting part is connected to the first and second wall parts can be prevented from whitening and becoming weak. Therefore, a long-life cover material terminal treating member that can withstand a long-time use can be provided.

DESCRIPTION OF SYMBOLS

Figure 1:
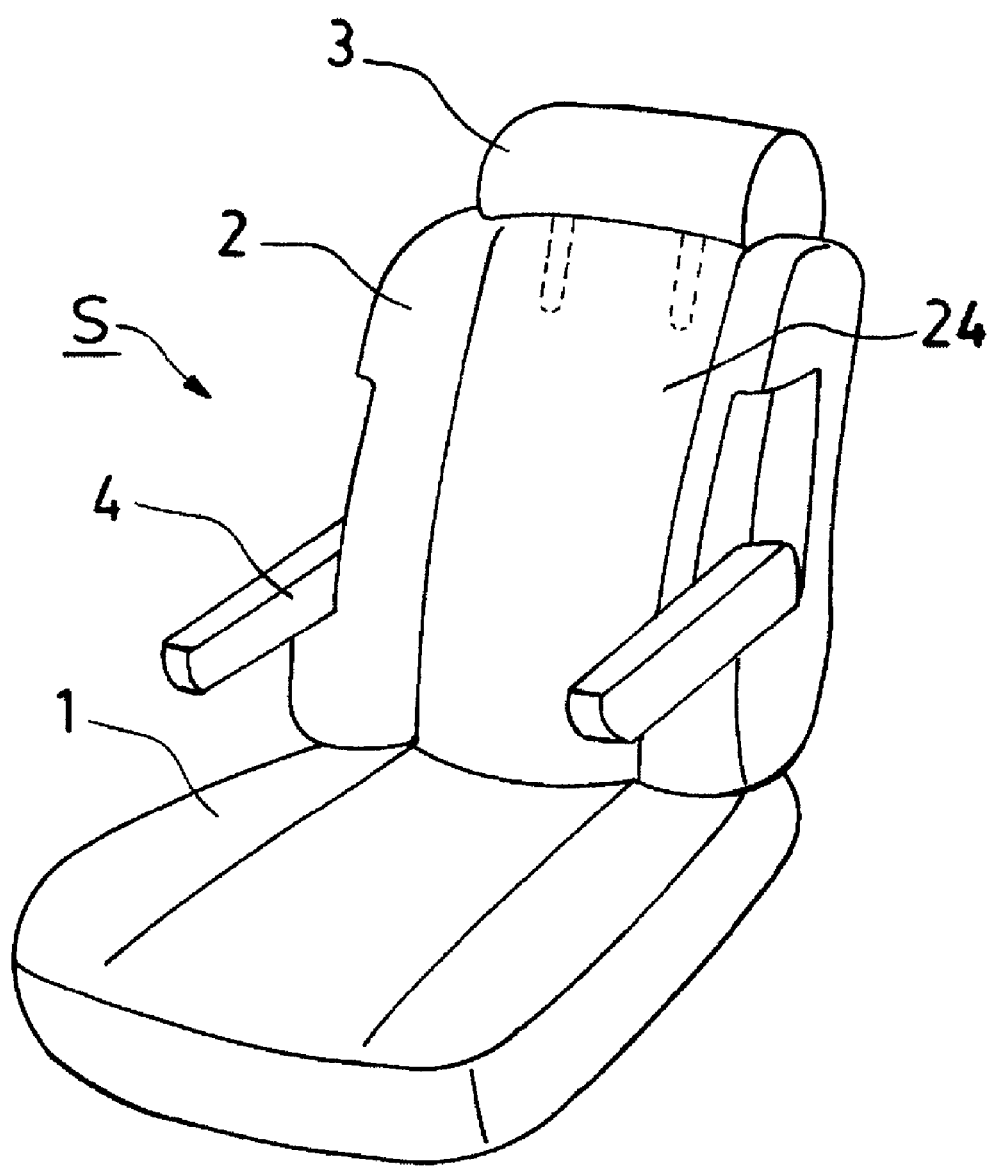
FIG. 1 is a schematic perspective view of a vehicle seat to which a cover material terminal treating member in accordance with one embodiment of the present invention is applied.

1 . . . seat cushion
2 . . . seat back
3 . . . headrest
4 . . . armrest
10 . . . cover material terminal treating member
11 . . . retaining clip
12, 42 . . . first wall part
12a . . . thick-wall part
12b . . . thin-wall part
12c . . . tip end
13, 43 . . . connecting part
14, 44 . . . second wall part
15 . . . protrusion
15a, 15b . . . slant surface
15c . . . vertex line
16 . . . retaining claw
16a . . . inside surface
17 . . . retaining plate
18 . . . clearance
19 . . . opening
21 . . . frame
22 . . . base plate
23 . . . cushion material
24 . . . cover material
24a . . . front surface side cover material
24b . . . back surface side cover material
25 . . . sewing part
26a, 26b, 32a, 32b . . . thread
31 . . . plate cover
41 . . . retaining clip part
101 . . . trim cover
101a . . . front surface side terminal
101b . . . back surface side terminal
102 . . . resin hook
103 . . . engagement groove
104 . . . retaining claw
105 . . . plate-shaped retaining member
106 . . . lower frame
107 . . . engagement part
108 . . . engagement wire
S . . . vehicle seat

BEST MODE FOR CARRYING OUT THE INVENTION

Figure 2:
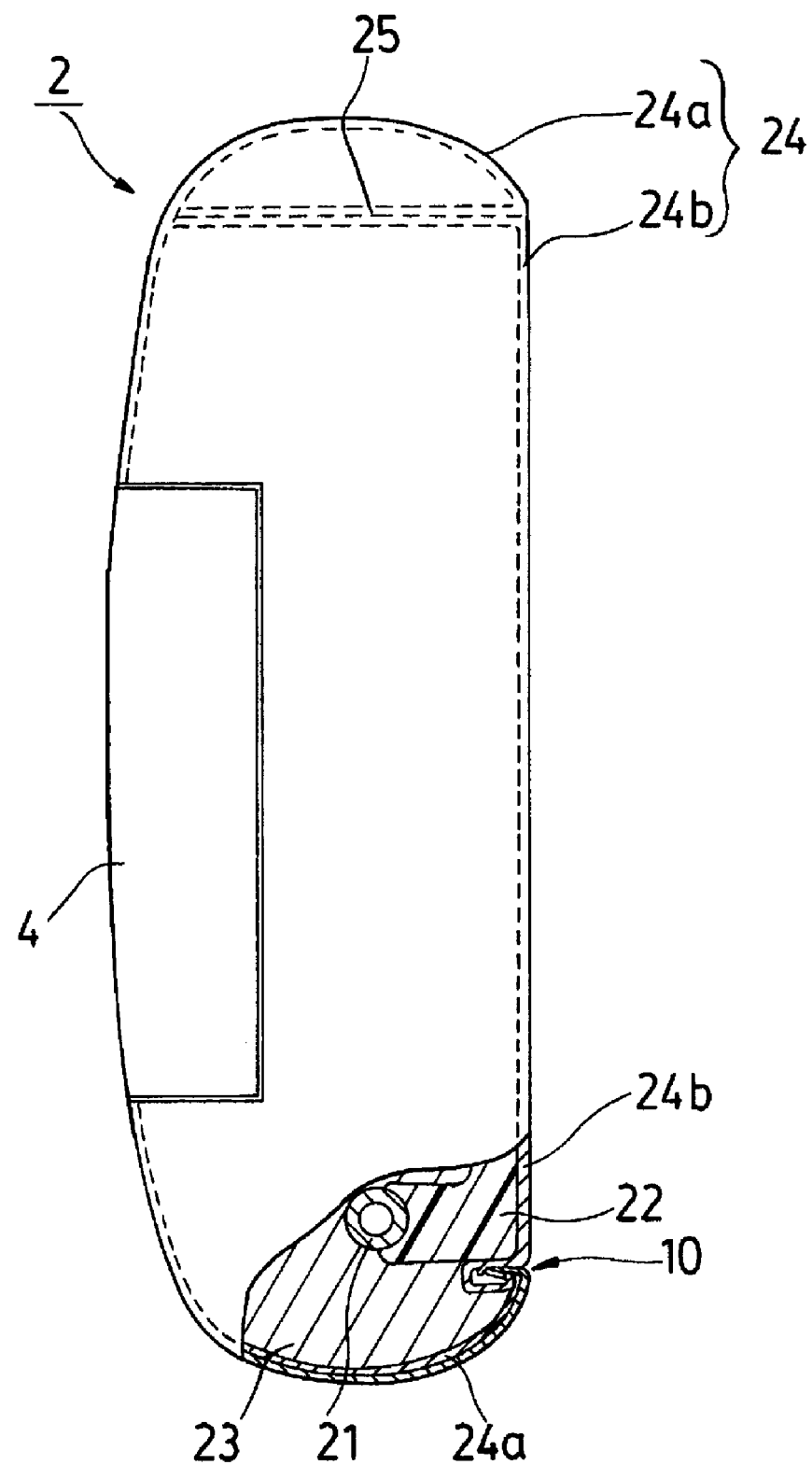
FIG. 2 is a partially sectioned side view of a seat back to which a cover material terminal treating member in accordance with one embodiment of the present invention is applied.
Figure 3:
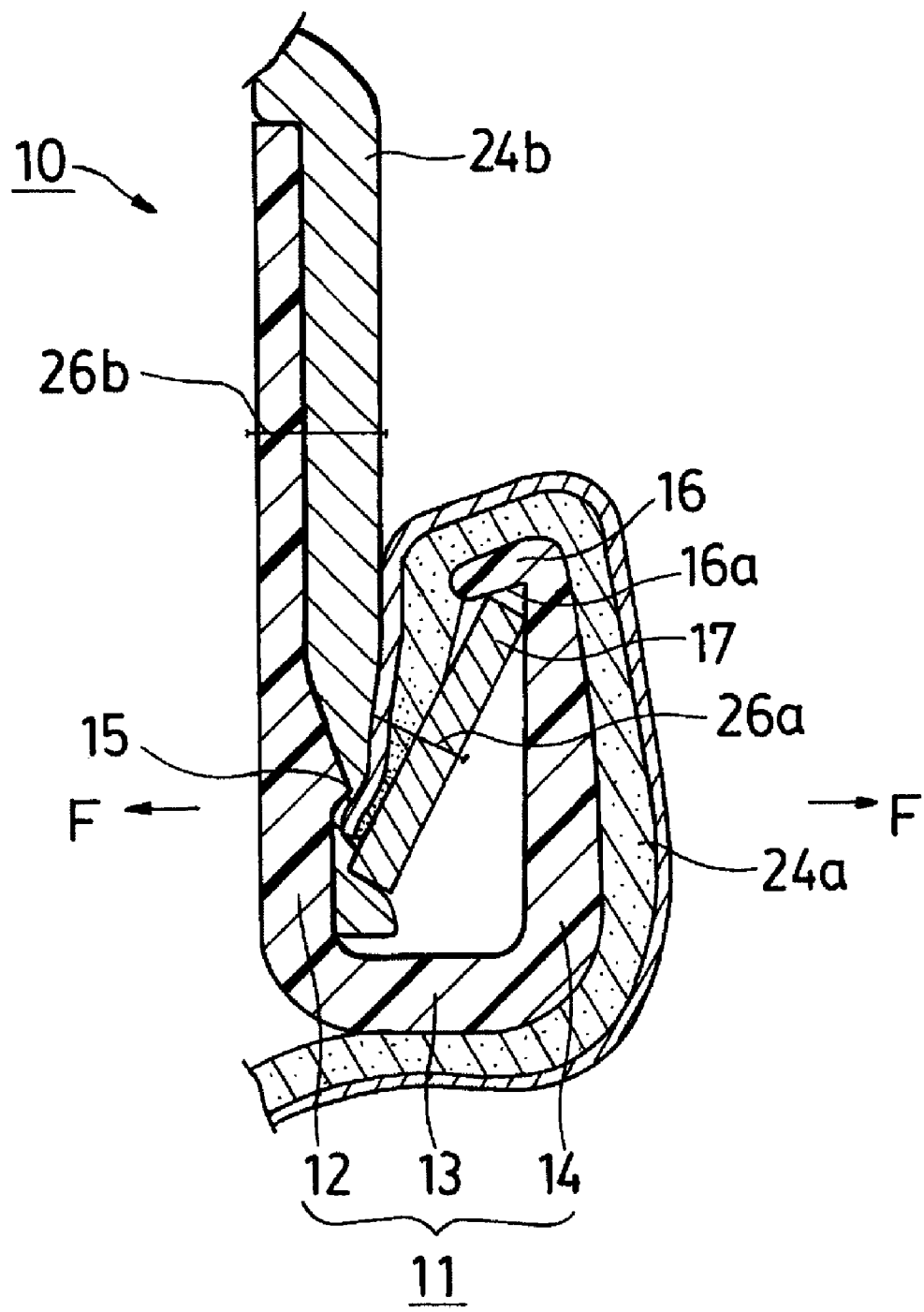
FIG. 3 is an enlarged view of a portion of the cover material terminal treating member shown in FIG. 2.
Figure 4:
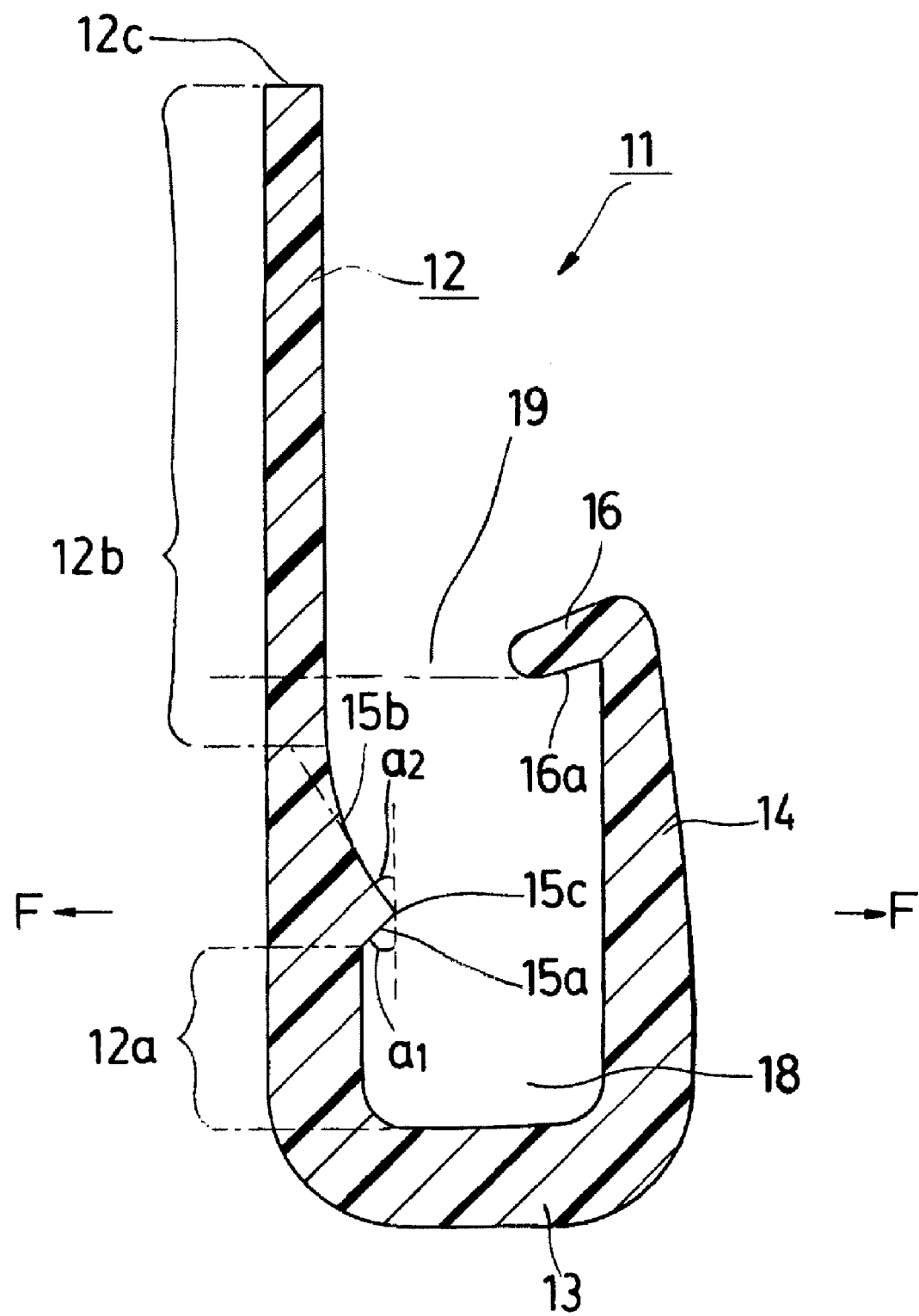
FIG. 4 is a sectional view of a retaining clip in accordance with one embodiment of the present invention.

An embodiment of the present invention will now be described with reference to the accompanying drawings. The members, arrangements, and the like explained below do not restrict the present invention, and needless to say, can be changed variously based on the teachings of the present invention. FIGS. 1 to 4 relates to one embodiment of the present invention. FIG. 1 is a schematic perspective view of a vehicle seat to which a cover material terminal treating member in accordance with one embodiment of the present invention is applied, FIG. 2 is a partially sectioned side view of a seat back to which the cover material terminal treating member in accordance with one embodiment of the present invention is applied, FIG. 3 is an enlarged view of a portion of the cover material terminal treating member shown in FIG. 2, and FIG. 4 is a sectional view of a retaining clip in accordance with one embodiment of the present invention.

This embodiment relates to a cover material terminal treating member of a seat back 2 used as a seat part. In this embodiment, explanation is given of the seat back 2 used as a seat part. However, the cover material terminal treatment can be applied similarly to various seat parts such as a seat cushion 1, a headrest 3, and an armrest 4. Also, the cover material terminal treatment can be applied to the seat part of any vehicle seat such as a driver's seat, a passenger seat, and a rear seat. Furthermore, the cover material terminal treatment can be applied to any seat that is configured so that a cushion material and the like are covered with a cover material, such as a vehicle seat including an automobile seat, a motorcycle seat, a ship seat, a bicycle saddle, and a child seat, and a chair used in a room.

The seat back 2 of this embodiment is a part for a vehicle seat S. As shown in FIG. 1, the vehicle seat S is configured by the seat cushion 1, the seat back 2, the headrest 3, and the armrests 4, and the seat back 2 is erected on the back surface side of the seat cushion 1. As shown in FIG. 2, the seat back 2 of this embodiment includes a frame 21 constituting a framework for the seat back 2, a base plate 22 serving as a substantially rectangular flat plate shaped support plate fixed to the frame 21, a substantially rectangular flat plate shaped cushion material 23 placed on the base plate 22 to support the passenger's back, and a cover material 24 for covering the frame 21, the base plate 22, and the cushion material 23.

The frame 21 consists of a publicly known seat back frame in which hollow cylindrical metallic pipes are formed into a substantially rectangular framework. The base plate 22 consists of a publicly known seat back base plate formed of a resin. The cushion material 23 consists of a publicly known cushion material formed of resin foam or the like.

The cover material 24 is formed of a publicly known material such as fabric, real leather, or synthetic leather. The cover material 24 is configured by sewing a front surface side cover material 24a covering the front surface side, the side surface side, the upper surface side, and the lower surface side of the seat back 2 and a back surface side cover material 24b covering the back surface side together by using a sewing part 25 in the upper part on the back surface side of the seat back 2, and is formed into a bag shape so as to wrap the frame 21, the base plate 22, and the cushion material 23. The front surface side cover material 24a is configured by sewing a cover material on the side surface side to a cover material on the front surface side, the upper surface side, and the lower surface side, and the cover material on the side surface side is sewed on both sides of the cover material on the front surface side. Also, the front surface side cover material 24a and the back surface side cover material 24b may be formed of the same material, or may be formed of a different material: for example, the front surface side cover material 24a is formed of real leather, synthetic leather, or the like, and the back surface side cover material 24b is formed of a needle punch or the like. As shown in FIG. 3, the front surface side cover material 24a of this embodiment is configured by two layers of real leather on the surface side and a foamed sheet used as a substrate layer for the real leather. However, the configuration of the front surface side cover material 24a is not limited to this configuration.

As shown in FIG. 2, the terminals of the front surface side cover material 24a and the back surface side cover material 24b are treated by connecting them to each other by a cover material terminal treating member 10 in the lower part on the back surface side of the seat back 2. In the case of this embodiment, the terminals of the front surface side cover material 24a and the back surface side cover material 24b are configured so as to be positioned in the lower part on the back surface side of the seat back 2. However, the configuration may be such that the cover material 24 is formed into a bag shape such that the sewing part 25 is arranged in the lower part on the back surface side of the seat back 2, and the upper part on the back surface side of the seat back 2 is open, and the terminals of the front surface side cover material 24a and the back surface side cover material 24b are connected to each other by the cover material terminal treating member 10 in the upper part on the back surface side of the back seat 2, whereby the terminal treatment is performed.

Next, the cover material terminal treating member 10 is explained in more detail with reference to FIGS. 3 and 4. FIG. 3 is an enlarged view of a portion of the cover material terminal treating member 10 shown in FIG. 2, and also is a longitudinal sectional view of the cover material terminal treating member 10. The cover material terminal treating member 10 includes a retaining clip 11 and a retaining plate 17. As shown in FIG. 3, the retaining clip 11 is a resin-made long member formed substantially into a J shape in cross section and arranged long along the terminal of the back surface side cover material 24b. The retaining plate 17 is a resin-made long plate member arranged long along the terminal of the front surface side cover material 24a. The retaining clip 11 has a shape such that a substantially plate-shaped first wall part 12, a substantially plate-shaped second wall part 14 arranged so as to face to the first wall part 12 in parallel, and a connecting part 13 for connecting the end parts of the first wall part 12 and the second wall part 14 to each other are formed integrally. As shown in FIG. 4, a clearance 18 surrounded by the first wall part 12, the connecting part 13, and the second wall part 14 is an internal space for storing the retaining plate 17. On the opposite side to the connecting part 13 of the clearance 18, an opening 19 for inserting the retaining plate 17 and the like into the clearance 18 is provided.

The first wall part 12 is formed with a protrusion 15 having a substantially triangular cross section on the surface facing to the second wall part 14 in the lengthwise direction of the retaining clip 11 (that is, the direction along the cover material 24b). As shown in FIG. 4, the protrusion 15 includes a slant surface 15a on the connecting part 13 side and a slant surface 15b on the opening 19 side with a vertex line 15c being the center. The slant surface 15a is formed by a substantially flat plane, and plays a role as a support surface for supporting the other end side of the retaining plate 17 by making contact with the retaining plate 17. The slant surface 15b consists of a smoothly curved surface having an arcuate cross section that is convex to the opposite side to the second wall part 14. Since the slant surface 15b is formed so as to be, a smoothly curved surface having an arcuate cross section that is convex to the opposite side to the second wall part 14, the slant surface 15b serves as a guide when the retaining plate is inserted into the clearance 18. Therefore, the retaining plate 17 can be inserted easily, and thereby the workability of insertion can be improved. All of the surfaces and the line constituting the protrusion 15, that is, the slant surface 15a, the slant surface 15b, and the vertex line 15c extend substantially in parallel in the lengthwise direction of the retaining clip 11 (that is, the direction along the cover material 24b) so as to face to an inside surface 16a of a retaining claw 16. Therefore, both end sides of the retaining plate 17 can be supported by the protrusion 15 and the inside surface 16a of the retaining claw 16 that face to each other and are substantially parallel with each other. Therefore, the retaining plate 17 can be prevented from rotating in the retaining clip 11.

As shown in FIG. 4, an angle $\alpha_1$ between the slant surface 15a and a plane on the clearance 18 side of the first wall part 12 and an angle $\alpha_2$ between a tangential plane near the vertex line 15c of the slant surface 15b and the plane on the clearance 18 side of the first wall part 12 are 45 degrees and 30 degrees, respectively. The angle $\alpha_1$ is larger than the angle $\alpha_2$. That is to say, the inclination of the slant surface 15a is steeper than that of the slant surface 15b. Therefore, the slant surface 15a can be provided with a sufficient inclination, and at the same time, the protrusion 15 can be prevented from becoming thin, so that the retaining plate 17 can be prevented form slipping gradually out of the slant surface 15a while the strength of the protrusion 15 is maintained. Thereby, the cover material terminal treating member 10 in which the retaining plate 17 is less liable to come off even if the member is used for a long period of time can be provided.

Also, the protrusion 15 is formed so that the slant surface 15a is at a position on the connecting part 13 side from the retaining claw 16 formed on the second wall part 14. By this configuration, the retaining plate 17 can be supported in the retaining clip 11.

Also, of the first wall part 12, a portion on the connecting part 13 side from the protrusion 15 is formed as a thick-wall part 12a, and is formed so as to be thicker than a thin-wall part 12b on the opening 19 side from the protrusion 15. Since the portion on the connecting part 13 side, which supports the retaining plate 17, is thick, even if a force is applied in the F direction such that the retaining clip 11 is widened by the retaining plate 17, the mouth of the retaining clip 11 can be prevented from widening. Further, since the thickness of the thin-wall part 12b is still small, the back surface side cover material 24b does not rise greatly at a tip end 12c of the first wall part 12 at which the back surface side cover material 24b enters the retaining clip 11, so that the appearance of a place at which the cover material terminal treating member 10 is installed can also be maintained. Also, the inclination of the slant surface 15b is formed so as to be gentler than that of the slant surface 15a, and the first wall part 12 is formed so as to become thin gradually toward the thin-wall part 12b side by the slant surface 15b. Therefore, there is no place at which the thickness of the first wall part 12 decreases suddenly, so that the strength at the place at which the thickness changes does not decrease.

The second wall part 14 is formed so that the length in the direction perpendicular to the terminal of the front surface side cover material 24a is shorter than the first wall part 12, and is also formed so that a portion thereof on the connecting part 13 side is thick and the thickness thereof decreases gradually toward the opening 19 side. Since the second wall part 14 is formed so that the portion thereof on the connecting part 13 side is thick, even if a force is applied in the F direction such that the retaining clip 11 is widened by the retaining plate 17, the mouth of the retaining clip 11 can be prevented from widening. Also, the tip end on the opening 19 side of the second wall part 14 is bent at an acute angle, and the folded part serves as the retaining claw 16 that makes contact with one end side of the retaining plate 17.

In this embodiment, the height from the surface on the clearance 18 side of the second wall part 14 to the retaining claw 16 (hereinafter, referred to as "the height of the retaining claw 16") is set at 0.8 mm or larger, preferably about 1.8 to 2.2 mm. If the height of the retaining claw 16 is set so as to be larger than the thickness of one end side of the retaining plate 17, even if a force is applied to the retaining plate 17 by an external force, the retaining claw 16 formed at an acute angle hangs over the retaining plate 17, so that one end side of the retaining plate 17 is inhibited from going over the tip end of the retaining claw 16. Therefore, this configuration is preferable because one end side of the retaining plate 17 can be supported stably by the retaining claw 16.

The connecting part 13 is continuous with the end parts of the first wall part 12 and the second wall part 14 to each other. In this embodiment, the connecting part 13 connects the end parts of the first wall part 12 and the second wall part 14 to each other. However, the configuration is not limited to this one if the clearance 18 surrounded by the first wall part 12, the connecting part 13, and the second wall part 14 is formed into a U shape. The cover material terminal treating member 10 may be formed into an H shape or an h shape by connecting the first wall part 12 and the second wall part 14 to each other at a position other than the end part, for example, a central position of the first wall part 12 and the second wall part 14. The thickness of a portion ranging from the thick-wall part 12a of the first wall part 12 to the second wall part 14 through the connecting part 13 is almost constant, and larger than the thickness of the thin-wall part 12b of the first wall part 12 and a portion near the opening 19 side of the second wall part 14. Therefore, even if a force is applied in the F direction such that the retaining clip 11 is widened by the retaining plate 17, the mouth of the retaining clip 11 can be prevented from widening. The retaining plate 17 is a resin-made long plate member having a thickness of 2 mm or smaller, preferably 0.8 to 1.2 mm, and the width thereof in the direction perpendicular to the terminal of the front surface side cover material 24a is set so as to be slightly narrower than the width of the second wall part 14 of the retaining clip 11.

As shown in FIG. 3, to the surface on the clearance 18 side of the first wall part 12 of the retaining clip 11, a portion near the terminal of the back surface side cover material 24b is sewed by a thread 26b. The terminal of the back surface side cover material 24b is arranged so as to be extended along the inside surface of the first wall part 12, and reaches a position on the connecting part 13 side from the protrusion 15. Also, to the retaining plate 17, a portion near the terminal of the front surface side cover material 24a is sewed by a thread 26a. One end side of the retaining plate 17 is supported on the retaining claw 16, and the other end side thereof is supported on the protrusion 15 and the thick-wall part 12a of the first wall part 12 in the clearance 18 of the retaining clip 11. Also, between the retaining plate 17 and the protrusion 15 and the thick-wall part 12a, the back surface side cover material 24b is arranged. This configuration plays a role as a shock absorbing material that makes the retaining plate 17 less liable to come off in the retaining clip 11.

In this embodiment, the terminals of the bag-shaped cover material 24 are connected to each other by the cover material terminal treating member 10. However, as another example of this embodiment, the configuration may be such that the outer peripheral terminal of the front surface side cover material 24a and the outer peripheral terminal of a plate cover 31 (see FIG. 6) fixed to the back surface side of the base plate 22 are connected to each other, and the first wall part 12 is fixed to the base plate 22. That is to say, the plate cover 31 formed of a publicly known cover material such as a needle punch is sewed in advance to the back surface of the base plate 22. The longitudinal and transverse lengths of the plate cover 31 are set so as to be slightly larger than those of the back surface of the base plate 22. The plate cover 31 is fixed so as to cover the whole of the back surface of the base plate 22, and four terminals thereof are made free ends projecting from the base plate 22. The outer peripheral terminal of the plate cover 31 is sewed to the thin-wall part 12b of the retaining clip 11.

Also, the outer peripheral terminal of the front surface side cover material 24a is sewed to the retaining plate 17, and the retaining plate 17 is retained to the retaining clip 11 as described above, by which the front surface side cover material 24a and the plate cover 31 are connected to each other. In this embodiment, the first wall part 12 of the retaining clip 11 is fixed to the base plate 22 side by sewing the terminal of the plate cover 31. However, the configuration is not limited to this one. The first wall part 12 may be fixed directly to the back surface of the base plate 22 by bolting or welding.

Figure 5:
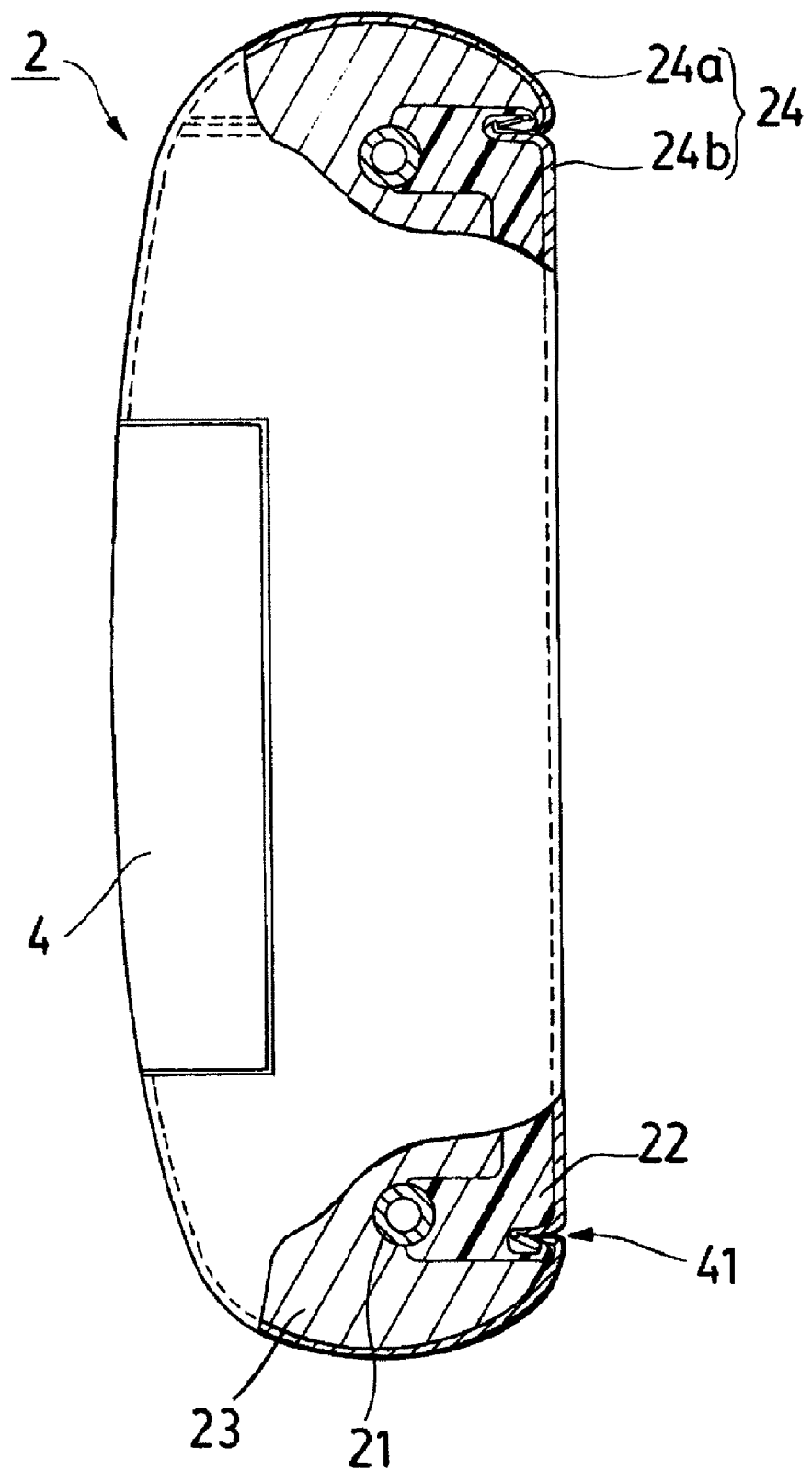
FIG. 5 is a partially sectioned side view of a seat back to which a cover material terminal treating member in accordance with still another example of the present invention is applied.
Figure 6:
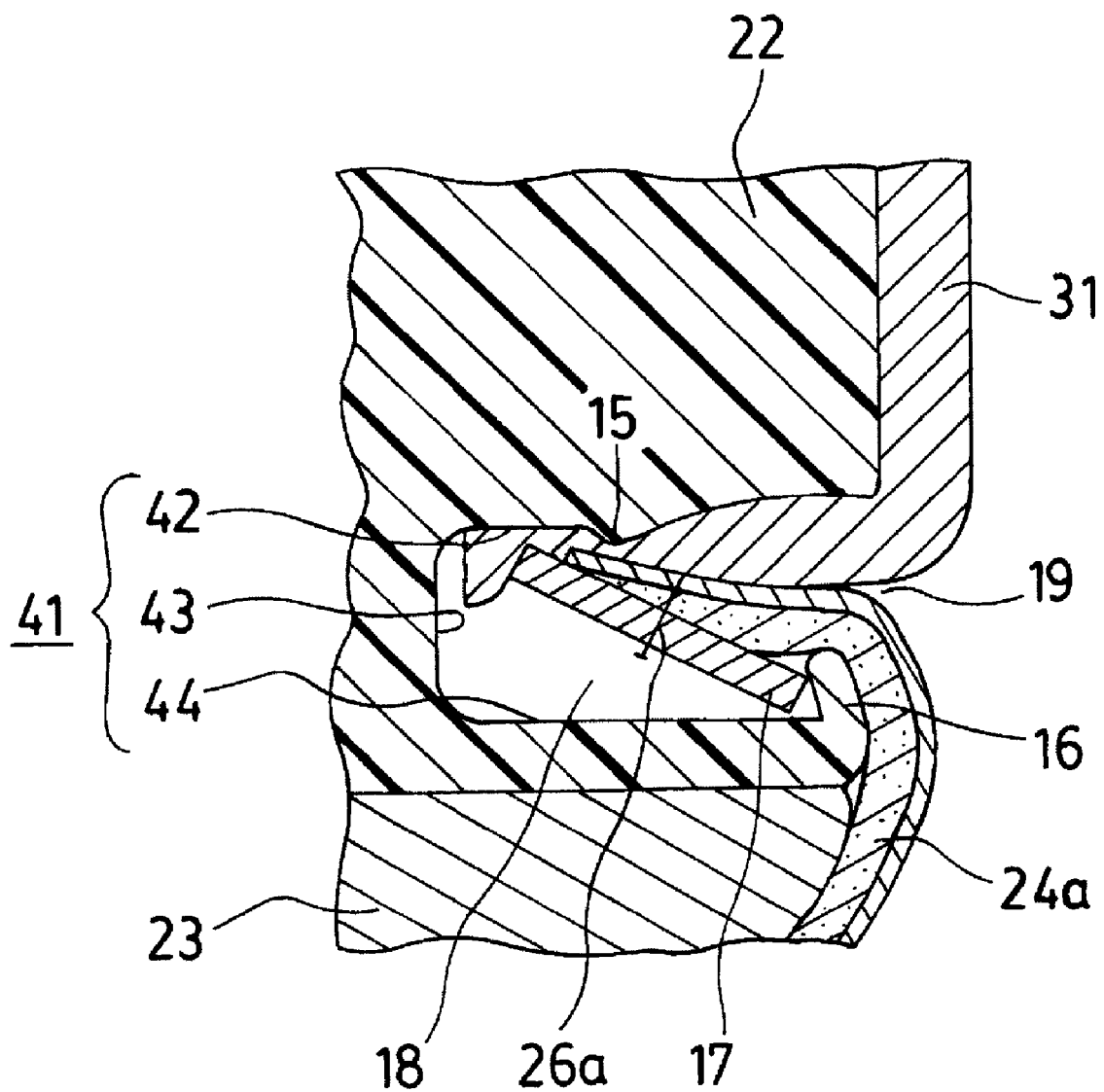
FIG. 6 is an enlarged view of a portion of the cover material terminal treating member shown in FIG. 5.
Figure 7:
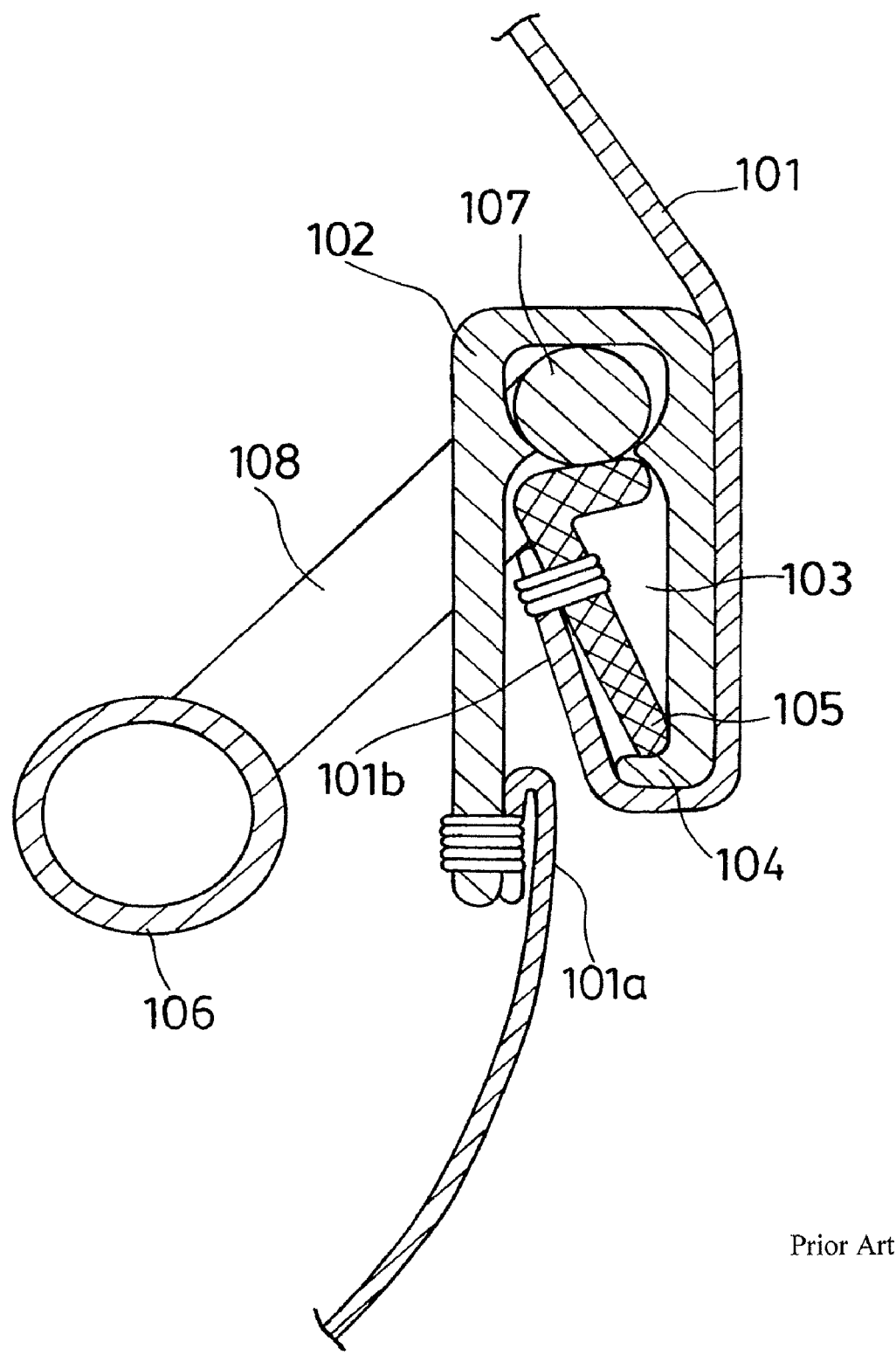
FIG. 7 is a sectional explanatory view showing a conventional example.

Furthermore, in this embodiment and the above-described example, the substantially J-shaped retaining clip 11 is used. However, as still another example, as shown in FIG. 5, the configuration may be such that in place of the use of the retaining clip 11, a groove-shaped retaining clip part 41 is formed at the outer periphery of the base plate 22, and the terminal of the front surface side cover material 24a is treated by a cover material terminal treating part consisting of the retaining clip part 41 and the retaining plate 17. FIG. 5 is a partially sectioned side view of a seat back to which another example of a cover material terminal treating member is applied, and FIG. 6 is an enlarged view of a portion of the cover material terminal treating part shown in FIG. 5. In this embodiment, in the peripheral edge part of the base plate 22, the groove-shaped retaining clip part 41 as shown in FIG. 6 is integrally formed along the outer peripheral shape of the base plate 22. The structure of the inner surface of the retaining clip part 41 is substantially similar to that of the inner surface of the retaining clip 11 shown in FIG. 3. As shown in FIG. 6, the retaining clip part 41 includes a substantially planar first wall part 42, a substantially planar second wall part 44 arranged so as to face to the first wall part 42 in parallel, and a connecting part 43 for connecting the far-side end parts of the first wall part 42 and the second wall part 44 to each other.

The first wall part 42 is formed with the protrusion 15 configured in the same way as shown in FIG. 3, and the second wall part 44 is formed with the retaining claw 16 configured in the same way as shown in FIG. 3. Also, to the back surface of the base plate 22, the plate cover 31 is sewed in advance. The longitudinal and transverse lengths of the plate cover 31 are set so as to be slightly larger than those of the base plate 22. The plate cover 31 is fixed so as to cover the whole of the back surface of the base plate 22, and as shown in FIG. 6, four terminals thereof are fixed along the first wall part 42 of the retaining clip 41, and reach a portion near the connecting part 43. The terminal treatment in this example is the same as that in the above-described example.

The invention claimed is:

1. A cover material terminal treatment for a seat part, wherein the seat part includes a cushion covered with a cover material, and wherein the cover material terminal treatment comprises:
    a retaining plate fixed to a terminal of the cover material; and,
    a retaining clip for storing the retaining plate in a clearance therein;
    the retaining clip comprising:
    a first wall fixed at a predetermined position different from the terminal;
    a second wall arranged so as to face to the first wall;
    a connecting part that connects the first wall and the second wall to each other so that the clearance is formed between the first and second walls and the connecting part, wherein the first and second walls and the connecting part form an opening on one end side of the clearance;
    a retaining claw formed in an end of the second wall at the opening, wherein the retaining claw is bent at an acute angle with respect to the first wall and contacts one end side of the retaining plate, and,
    a protrusion on a surface of the first wall facing the second wall at a distance in a longitudinal direction of the retaining clip from the retaining claw, wherein the protrusion supports the other end side of the retaining plate.

2. The cover material terminal treatment according to claim 1, wherein the first wall is thicker between the protrusion and the connecting part than on an opening side of the protrusion.

3. The cover material terminal treatment according to claim 1, wherein the first wall between the protrusion and the connecting part, the connecting part, and a portion of the second wall near the connecting part are thicker than the first wall on an opening side of the protrusion and a portion of the second wall near the opening.

4. The cover material terminal treatment according to claim 1, wherein a height of the retaining claw is larger than the thickness of the one end side of the retaining plate.

5. The cover material terminal treatment according to claim 1, wherein the protrusion has a support surface that supports the other end side of the retaining plate in a portion of the clearance between the protrusion and the connecting part.

6. The cover material terminal treatment according to claim 1, wherein the protrusion has a support surface that supports the other end side of the retaining plate in a portion of the clearance between the protrusion and the connecting part, and wherein a shock absorbing material is provided on the support surface.

7. The cover material terminal treatment according to claim 1, wherein the protrusion has first and second slant surfaces forming a substantially triangular shape in cross section, wherein the first slant surface generally faces the opening, wherein the second slant surface generally faces the connecting part, and wherein the inclination of the second slant surface is steeper than the inclination of the first slant surface.

8. The cover material terminal treatment according to claim 1, wherein the protrusion has first and second slant surfaces forming a substantially triangular shape in cross section, wherein the first slant surface generally faces the opening, wherein the second slant surface generally faces the connecting part, wherein an inclination of the second slant surface is steeper than an inclination of the first slant surface, and wherein the first slant surface consists of a curved surface having an arcuate shape in cross section that is convex to an opposite side of the second wall.

9. The cover material terminal treatment according to claim 1, wherein the terminal comprises a first terminal of the cover material, and wherein the predetermined position is at a second terminal of the cover material that is different from the first terminal or a support plate of the seat part.

10. The cover material terminal treatment according to claim 1, wherein a first portion of the first wall between the protrusion and the opening is farther from the second wall than a second portion of the first wall between the protrusion and the connecting part.

11. A seat part having a cushion covered with a cover material using a cover material terminal treatment, wherein the cover material terminal treatment comprises:
    a retaining plate fixed to a terminal of the cover material;
    a retaining clip that stores the retaining plate in a clearance therein;
    wherein the retaining clip comprises:
    a first wall fixed at a predetermined position different from the terminal;
    a second wall arranged so as to face to the first wall;
    a connecting part that connects the first wall and the second wall to each other so as to form a clearance and an opening at least at one end of the clearance, wherein the opening is between the second wall and the first wall;
    a retaining claw in an end of the second wall at the opening side of the second wall, wherein the retaining claw is bent at an acute angle with respect to the first wall side and contacts one end side of the retaining plate; and, a protrusion on the surface on the first wall that faces the second wall at a distance in a longitudinal direction of the retaining clip from the retaining claw, wherein the protrusion supports the other end side of the retaining plate.

12. A seat part having a support plate and a cushion supported on the support plate, wherein the seat part is covered with a cover material, the seat part comprising:

a cover material terminal treatment at an outer periphery of the support plate, the cover material terminal treatment comprising:

a retaining plate fixed to a terminal of the cover material; and, a groove-shaped retaining clip formed integrally at the outer periphery of the support plate to store the retaining plate in a clearance therein;

wherein the retaining clip comprises:

a first wall;

a second wall formed on the support plate outer periphery side so as to face to the first wall;

a connecting part that connects the first wall and the second wall to each other so as to form a clearance between the first and second walls and an opening at one end of the clearance;

a retaining claw at an end of the second wall near the opening, the retaining claw being bent at an acute angle with respect to the first wall and in contact with one end side of the retaining plate; and, a protrusion on a surface on the first wall that faces the second wall at a distance in a longitudinal direction of the retaining clip from the retaining claw, wherein the protrusion supports the other end side of the retaining plate.

13. A vehicle seat having a seat part, wherein the seat part includes a cushion, a cover material covering the cushion, and a cover material terminal treatment treating a terminal of the cover material, the cover material terminal treatment comprising:

a retaining plate fixed to the terminal of the cover material; and, a retaining clip for storing the retaining plate in a clearance therein;

the retaining clip comprising:

a first wall fixed at a predetermined position different from the terminal;

a second wall arranged so as to face to the first wall;

a connecting part that connects the first wall and the second wall to each other so as to form a clearance between the first and second walls and the connecting part, an end of the clearance forming an opening a retaining claw at an end of the second wall near the opening, wherein the retaining claw is bent at an acute angle with respect to the first wall and contacts one end side of the retaining plate; and, a protrusion on a surface of the first wall that faces the second wall at a distance in a longitudinal direction of the retaining clip from the retaining claw, wherein the protrusion supports the other end side of the retaining plate.

14. A vehicle seat having a seat part, the seat part having a support plate and a cushion supported on the support plate, the support plate and the cushion being covered with a cover material, the vehicle seat comprising:

a cover material terminal treatment at the outer periphery of the support plate, the cover material terminal treatment comprising a retaining plate and a groove-shaped retaining clip, wherein the retaining plate is fixed to a terminal of the cover material, and wherein the retaining clip is formed integrally at the outer periphery of the support plate to store the retaining plate in a clearance therein;

the retaining clip comprising:

a first wall;

a second wall formed on an outer periphery side of the support plate so as to face to the first wall; and, a connecting part that connects the first wall and the second wall to each other so that the clearance is formed between the first and second walls and the connecting part, wherein the first and second walls and the connecting part form an opening on one end side of the clearance; and, the cover material terminal treatment further comprising a retaining claw and a protrusion, wherein the retaining claw is formed in an end of the second wall at the opening, wherein the retaining claw is bent at an acute angle with respect to the first wall side and is in contact with one end side of the retaining plate, wherein the protrusion is formed on a surface on the first wall that faces the second wall at a distance in a longitudinal direction of the retaining clip from the retaining claw, and wherein the protrusion supports the other end side of the retaining plate.

* * * * *